(12) United States Patent
Saretto et al.

(10) Patent No.: US 9,002,924 B2
(45) Date of Patent: Apr. 7, 2015

(54) CONTEXTUAL BASED INFORMATION AGGREGATION SYSTEM

(75) Inventors: Cesare John Saretto, Seattle, WA (US);
Peter Tobias Kinnebrew, Seattle, WA (US); Nicholas Ferianc Kamuda, Seattle, WA (US); Henry Hooper Somuah, Seattle, WA (US); Matthew John McCloskey, Seattle, WA (US); Douglas C. Hebenthal, Bellevue, WA (US); Kathleen P. Mulcahy, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 12/818,106

(22) Filed: Jun. 17, 2010

(65) Prior Publication Data
US 2011/0314084 A1 Dec. 22, 2011

(51) Int. Cl.
| | |
|---|---|
| *G06F 15/16* | (2006.01) |
| *G06F 17/30* | (2006.01) |
| *G06Q 50/00* | (2012.01) |
| *H04N 21/2668* | (2011.01) |
| *H04N 21/442* | (2011.01) |
| *H04N 21/658* | (2011.01) |
| *H04W 4/02* | (2009.01) |
| *H04W 4/18* | (2009.01) |
| *G06Q 30/02* | (2012.01) |
| *H04W 4/20* | (2009.01) |

(52) U.S. Cl.
CPC .......... *G06F 17/30867* (2013.01); *G06Q 50/01* (2013.01); *H04N 21/2668* (2013.01); *H04N 21/44222* (2013.01); *H04N 21/6582* (2013.01); *H04W 4/023* (2013.01); *H04W 4/185* (2013.01); *G06Q 30/02* (2013.01); *G06Q 30/0201* (2013.01); *H04W 4/206* (2013.01)

(58) Field of Classification Search
None
See application file for complete search history.

(56) References Cited

U.S. PATENT DOCUMENTS

| | | | |
|---|---|---|---|
| 6,175,831 | B1 | 1/2001 | Weinreich |
| 6,317,783 | B1 | 11/2001 | Freishtat |
| 6,704,747 | B1 | 3/2004 | Fong |

(Continued)

FOREIGN PATENT DOCUMENTS

| | | |
|---|---|---|
| CN | 1574873 | 2/2005 |
| CN | 101162393 | 4/2008 |

(Continued)

OTHER PUBLICATIONS

Yang, "A Web Recommendation Method Based on User Interest Model", Proceedings of the Fifth International Conference on Machine Learning and Cybernetics, Aug. 13-16, 2006, pp. 4536-4539, http://ieeexplore.ieee.org/stamp/stamp.jsp?tp=&arnumber=4028871&userType=inst.

(Continued)

*Primary Examiner* — Brian P Whipple
(74) *Attorney, Agent, or Firm* — Dan Choi; Judy Yee; Micky Minhas

(57) ABSTRACT

A system automatically and continuously finds and aggregates the most relevant and current information about the people and things that a user cares about. The information gathering is based on current context (e.g., where the user is, what the user is doing, what the user is saying/typing, etc.). The result of the context based information gathering is presented ubiquitously on user interfaces of any of the various physical devices operated by the user.

18 Claims, 13 Drawing Sheets

(56) References Cited

U.S. PATENT DOCUMENTS

| | | | |
|---|---|---|---|
| 7,266,535 B1 | 9/2007 | Nelken et al. | |
| 7,349,913 B2 | 3/2008 | Clark et al. | |
| 7,451,152 B2 | 11/2008 | Kraft | |
| 7,526,458 B2 | 4/2009 | Flinn et al. | |
| 7,603,342 B2 | 10/2009 | Gosse | |
| 7,634,720 B2 | 12/2009 | Haluptzok et al. | |
| 7,689,524 B2 | 3/2010 | Ozzie | |
| 7,899,806 B2 | 3/2011 | Aravamudan | |
| 7,966,160 B2* | 6/2011 | Bellifemine et al. | 703/2 |
| 8,140,566 B2 | 3/2012 | Boerries | |
| 8,606,897 B2 | 12/2013 | Ferris | |
| 2002/0198882 A1 | 12/2002 | Linden | |
| 2003/0135556 A1* | 7/2003 | Holdsworth | 709/206 |
| 2004/0064566 A1* | 4/2004 | Striemer | 709/228 |
| 2004/0248588 A1 | 12/2004 | Pell | |
| 2005/0021369 A1 | 1/2005 | Cohen et al. | |
| 2005/0060365 A1 | 3/2005 | Robinson | |
| 2005/0278326 A1* | 12/2005 | Horvitz et al. | 707/6 |
| 2006/0142030 A1 | 6/2006 | Coskun | |
| 2006/0184508 A1 | 8/2006 | Fuselier et al. | |
| 2006/0195477 A1 | 8/2006 | Deem et al. | |
| 2006/0200834 A1 | 9/2006 | Cukierman et al. | |
| 2007/0118639 A1* | 5/2007 | Bellifemine et al. | 709/224 |
| 2007/0156842 A1 | 7/2007 | Vermeulen et al. | |
| 2007/0244750 A1 | 10/2007 | Grannan | |
| 2008/0052639 A1 | 2/2008 | Chun | |
| 2008/0077574 A1 | 3/2008 | Gross | |
| 2008/0091722 A1 | 4/2008 | Wendelrup | |
| 2008/0126961 A1 | 5/2008 | Naaman et al. | |
| 2008/0133336 A1 | 6/2008 | Altman | |
| 2008/0201731 A1 | 8/2008 | Howcroft | |
| 2009/0037355 A1 | 2/2009 | Brave et al. | |
| 2009/0083141 A1 | 3/2009 | Craine | |
| 2009/0083768 A1 | 3/2009 | Hatalkar et al. | |
| 2009/0094627 A1 | 4/2009 | Lee | |
| 2009/0113346 A1 | 4/2009 | Wickramasuriya et al. | |
| 2009/0157513 A1 | 6/2009 | Bonev | |
| 2009/0182770 A1 | 7/2009 | Madhavan | |
| 2009/0187466 A1 | 7/2009 | Carter | |
| 2009/0319166 A1 | 12/2009 | Khosravy | |
| 2010/0106672 A1 | 4/2010 | Robson et al. | |
| 2011/0022965 A1* | 1/2011 | Lawrence et al. | 715/747 |
| 2011/0066507 A1 | 3/2011 | Lyer | |
| 2011/0258110 A1 | 10/2011 | Antoci | |
| 2011/0258467 A1 | 10/2011 | Antoci | |
| 2011/0270135 A1 | 11/2011 | Dooley | |

FOREIGN PATENT DOCUMENTS

| | | |
|---|---|---|
| CN | 101576930 | 11/2009 |
| CN | 101662403 | 3/2010 |
| CN | 101779180 | 7/2010 |
| JP | 2003122757 A | 4/2003 |
| JP | 2006031200 A | 2/2006 |
| JP | 2009223456 A | 10/2009 |
| JP | 2009251855 A | 10/2009 |
| KR | 10-2010-0012181 | 2/2010 |
| WO | 2007067248 A2 | 6/2007 |

OTHER PUBLICATIONS

Middleton, "Capturing Knowledge of User Preferences: Ontologies in Recommender Systems", Proceedings of the First International Conference on Knowledge Capture, Oct. 2001, ACM, New York, NY, USA.

PCT International Search Report dated Nov. 10, 2011, PCT Patent Application No. PCT/US2011/038958.

PCT Written Opinion of the International Searching Authority dated Nov. 10, 2011, PCT Patent Application No. PCT/US2011/038958.

English Abstract of Korean Patent Application KR10-2010-0012181.

Gao, Min and Wu, Zhongfu. "Incorporating Personalized Contextual Information in Item-based Collaborative Filtering Recommendation." Journal of Software. Jul. 2010, vol. 5, No. 7, pp. 729-736. Academy Publisher, Oulu, Finland.

Herrada, Oscar Celma, "Music Recommendation and Discovery in the Long Tail." Doctoral Thesis, Department of Information and Communication Technologies, Universitat Pompeu Fabra (UPF). Feb. 2009 (Thesis Defense). UPF, Barcelona, Spain. 252 pages.

"Moving or Unpinning a Tile on Start", Windows Phone 7, Microsoft How-to [online]. Copyright 2011 Microsoft [retrieved Jan. 11, 2011]. Retrieved from the Internet: <URL: http://www.microsoft.com/windowsphone/en-au/howto/wp7/start/move-or-delete-tile-on-start.aspx>, 1 page.

"Cisco 3300 Series Mobility Services Engine Data Sheet." Cisco [online]. Retrieved from the Internet on Nov. 19, 2010, URL: <http://www.cisco.com/en/US/prod/collateral/wireless/ps9733/ps9742/data_sheet_c78-475378.html>, 5 pages.

Frederico Lopes, Flavia Delicato, Thais Batista and Nelio Cacho. "On the Integration of Context-based Heterogeneous Middleware for Ubiquitous Computing." 6th International Workshop on Middleware for Pervasive and Ad-Hoc Computing, Dec. 1-5, 2008, Association for Computing Machinery, Leuven, Belgium. 7 pages.

Tong, "Universal Data Model Platform: The Data-centric Evolution for System Level Codesign", Proceedings of the 10th International Conference on Computer Supported Cooperative Work in Design, Southeast University, Nanjing, China, May 3-5, 2006, pp. 1037-1042, IEEE Publishers.

"CNN.com—Breaking News, U.S., World, Weather, . . . " (CNN.com website with Facebook login showing Friends' Activity), [online], [retrieved on Feb. 10, 2011], Retrieved from the Internet while logged into Facebook: <URL: http//www.cnn.com/>, 1 page.

Grabs, Torsten et al. "Introducing Microsoft StreamInsight", Microsoft SQL Server 2008, Technical Article, Sep. 2009, 26 pages.

U.S. Appl. No. 12/819,115, filed Jun. 18, 2010.

U.S. Appl. No. 13/027,851, filed Feb. 15, 2011.

Office Action dated Aug. 31, 2012, U.S. Appl. No. 12/819,115.

Response to Office Action dated Sep. 4, 2012, U.S. Appl. No. 13/027,851.

Office Action dated Mar. 29, 2012, U.S. Appl. No. 13/027,851.

Voluntary Amendments dated Feb. 7, 2012 in Chinese Patent Application No. 201110179032.9, filed Jun. 20, 2011, 9 pages.

English translation of claims as amended in Voluntary Amendments dated Feb. 7, 2012 in Chinese Patent Application No. 201110179032.9, filed Jun. 20, 2011, 4 pages.

U.S. Appl. No. 13/027,066, filed Feb. 14, 2011.

English Translation of Voluntary Claim Amendments filed Mar. 25, 2014, Chinese Patent Application No. 2012100327809, 10 pages.

Office Action dated Mar. 20, 2014, U.S. Appl. No. 12/819,115.

Office Action dated Apr. 16, 2013, U.S. Appl. No. 12/819,115.

Chinese Office Action dated Apr. 1, 2013, Chinese Patent Application No. 201110179032.9.

English Abstract for Chinese Patent Application No. CN101662403 published Mar. 3, 2010.

Response to Office Action dated May 20, 2013, U.S. Appl. No. 13/027,066.

Final to Office Action dated Jun. 26, 2013, U.S. Appl. No. 13/027,066.

Response to Office Action dated Jul. 2, 2013, U.S. Appl. No. 13/027,851.

Response to Office Action dated Jul. 16, 2013, U.S. Appl. No. 12/819,115.

Office Action dated Nov. 21, 2012, U.S. Appl. No. 13/027,066.

Response to Office Action dated Dec. 31, 2012, U.S. Appl. No. 12/819,115.

Office Action dated Jan. 2, 2013, U.S. Appl. No. 13/027,851.

Response to Chinese Office Action dated Aug. 15, 2013, English Summary of the Arguments, Amended Claims in English, for Chinese Patent Application No. 201110179032.9.

Chinese Office Action dated Dec. 6, 2013, with partial English translation, Chinese Patent Application No. 201110179032.9.

Office Action dated Dec. 20, 2013, U.S. Appl. No. 12/819,115.

Response to Office Action dated Dec. 26, 2013, U.S. Appl. No. 13/027,066.

Response to Chinese Office Action dated Feb. 19, 2014, English Summary of the Arguments, Amended Claims in English, for Chinese Patent Application No. 201110179032.9.

(56) References Cited

OTHER PUBLICATIONS

Chinese Office Action dated Jan. 13, 2014, Chinese Patent Application No. 201210031564.2.
Office Action dated Feb. 13, 2014, U.S. Appl. No. 13/027,066.
English Translation of Abstract of Chinese Patent Application No. CN101779180, Last Updated: Nov. 12, 2013.
Response to Office Action filed May 27, 2014, Chinese Patent Application No. 201210031564.2, with English translation summary of the response and amended claims.
Chinese Office Action dated May 9, 2014, Chinese Patent Application No. 201110179032.9.
Response to Chinese Office Action dated Jul. 24, 2014, Chinese Patent Application No. 201110179032.9.
Office Action dated May 29, 2014, U.S. Appl. No. 13/027,851.
Response to Office Action dated Aug. 13, 2014, U.S. Appl. No. 13/027,066.
Chinese Office Action filed Aug. 20, 2014, Chinese Patent Application No. 201210031564.2.
Chinese Office Action dated Sep. 4, 2014, Chinese Patent Application No. 201110179032.9.
English Abstract of Chinese Patent Application No. CN101576930.
English Abstract of Chinese Patent Application No. CN1574873.
Response to Office Action dated Oct. 30, 2014, U.S. Appl. No. 13/027,851.
Chinese Office Action dated Jan. 4, 2015, Chinese Patent Application No. 201180029546.4.
Request for Reexamination, Chinese Patent Application No. 201110179032.9.
"Office Action Issued In Japanese Patent Application No. 2013-515371", Mailed Date: Jan. 27, 2015, 12 Pages.

* cited by examiner

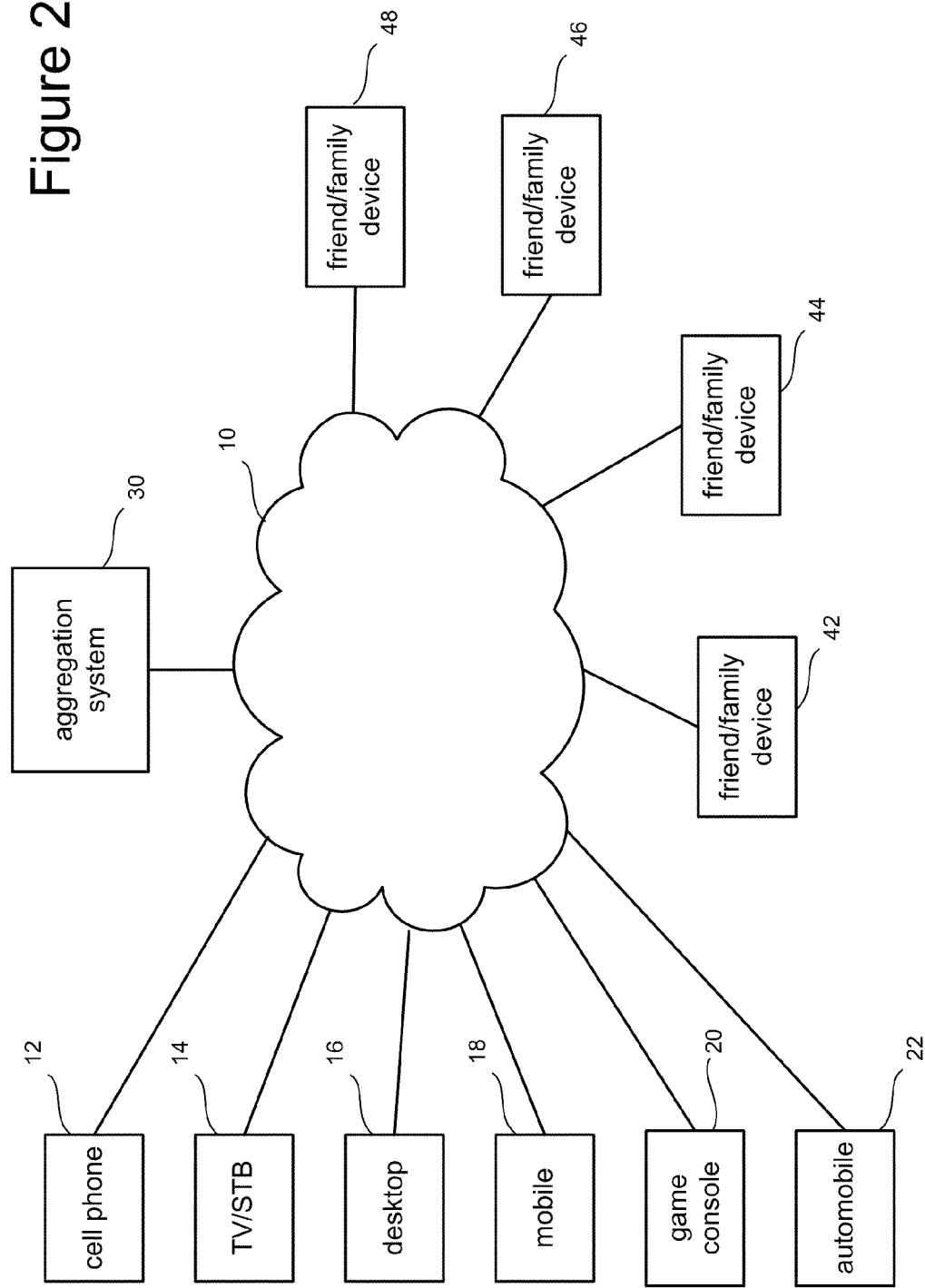

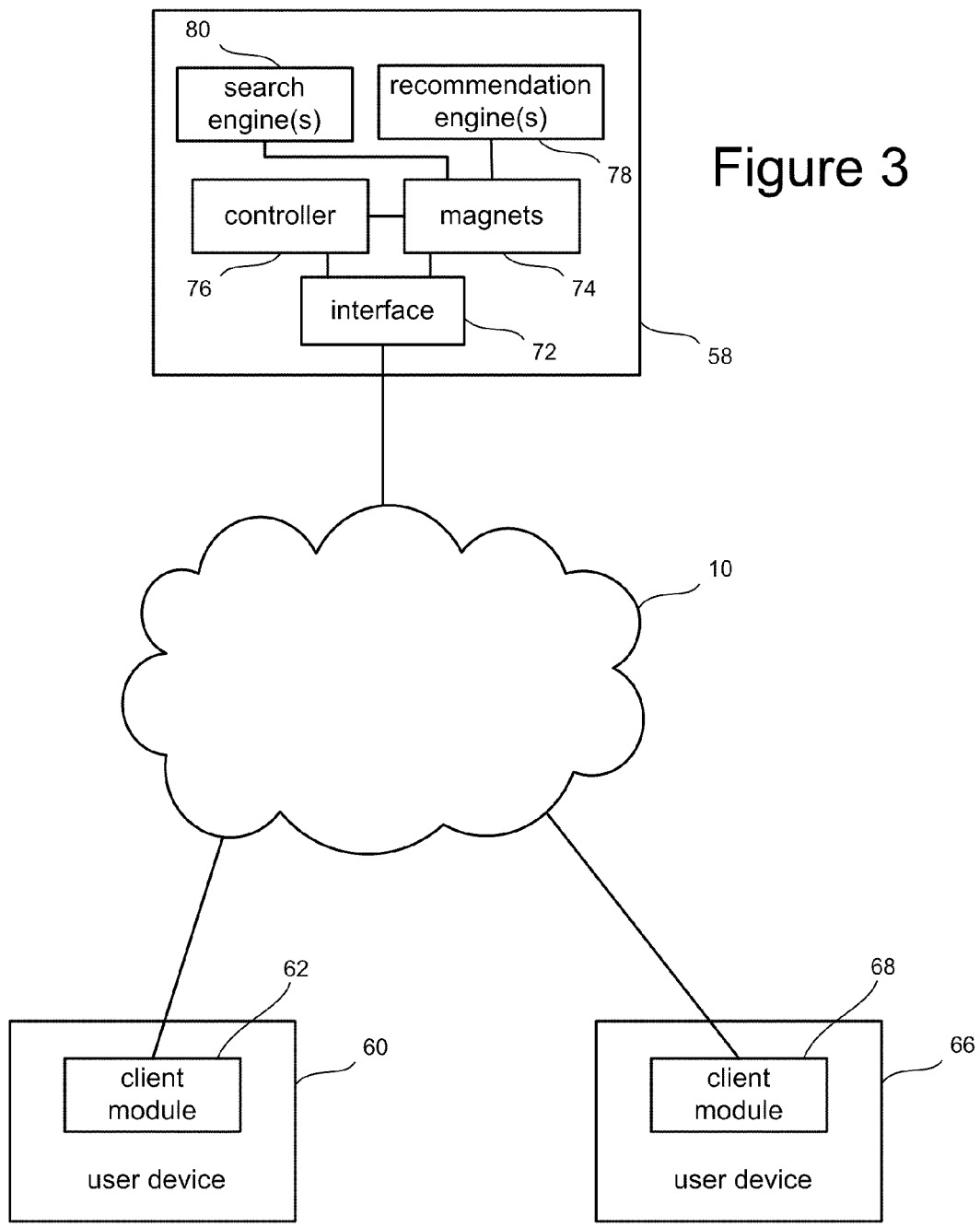

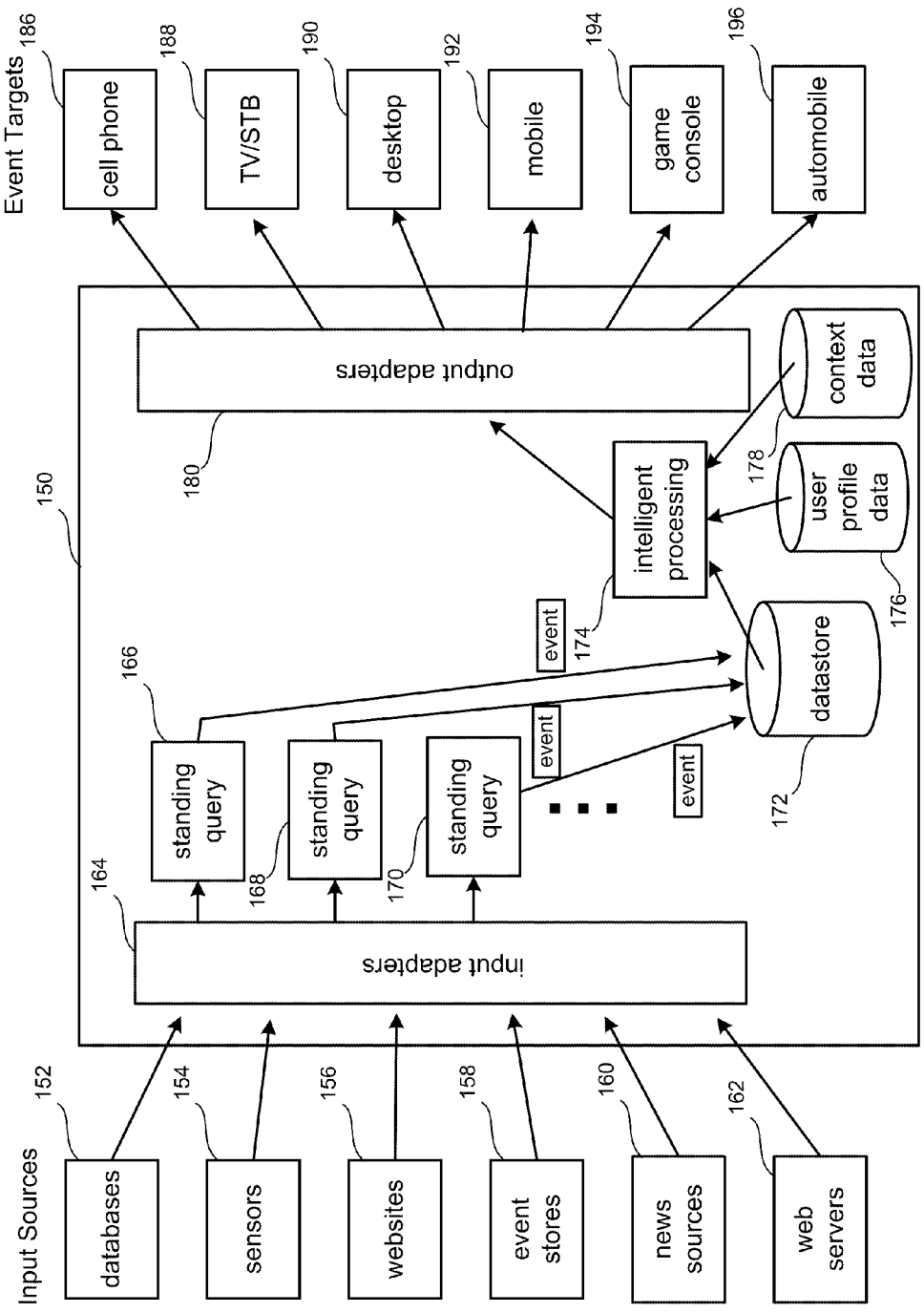

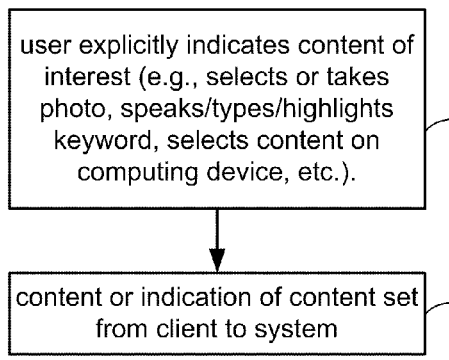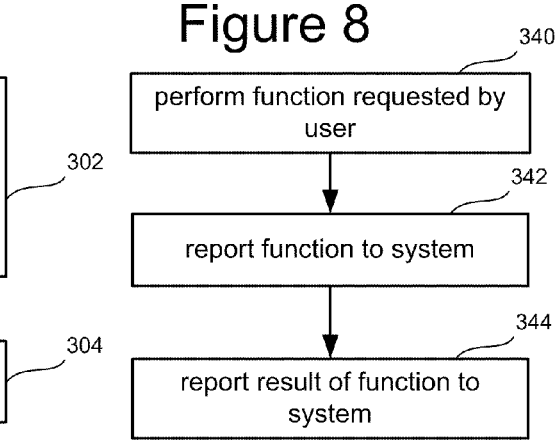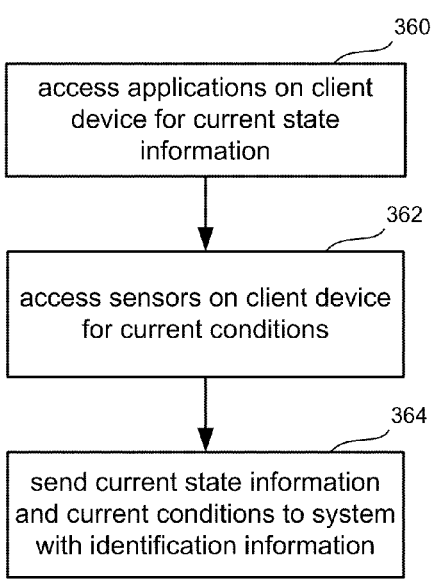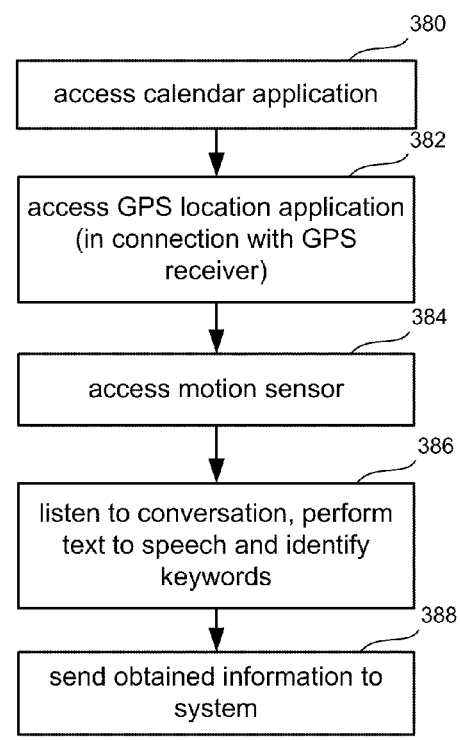

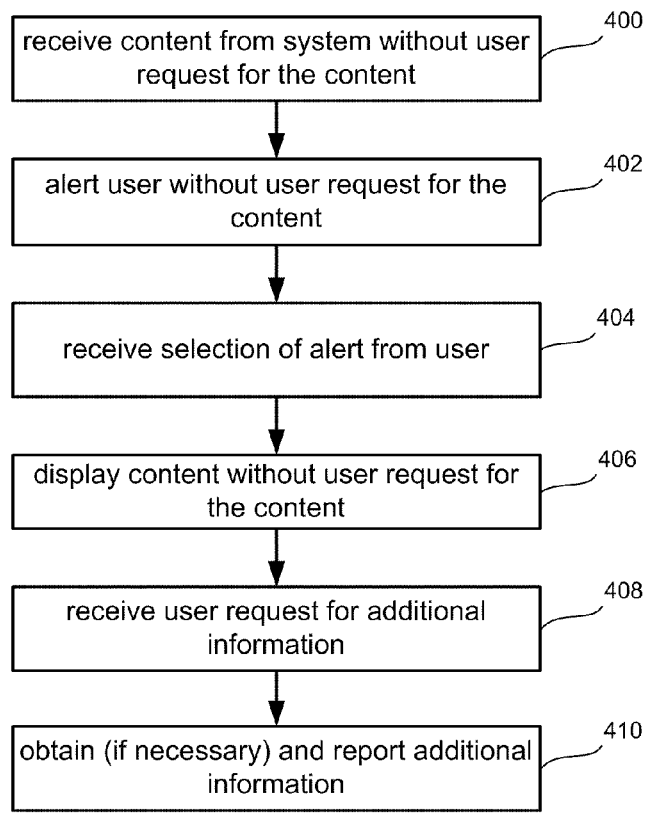
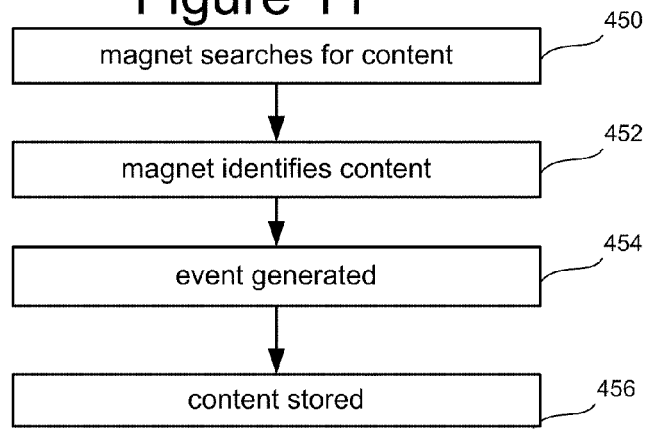

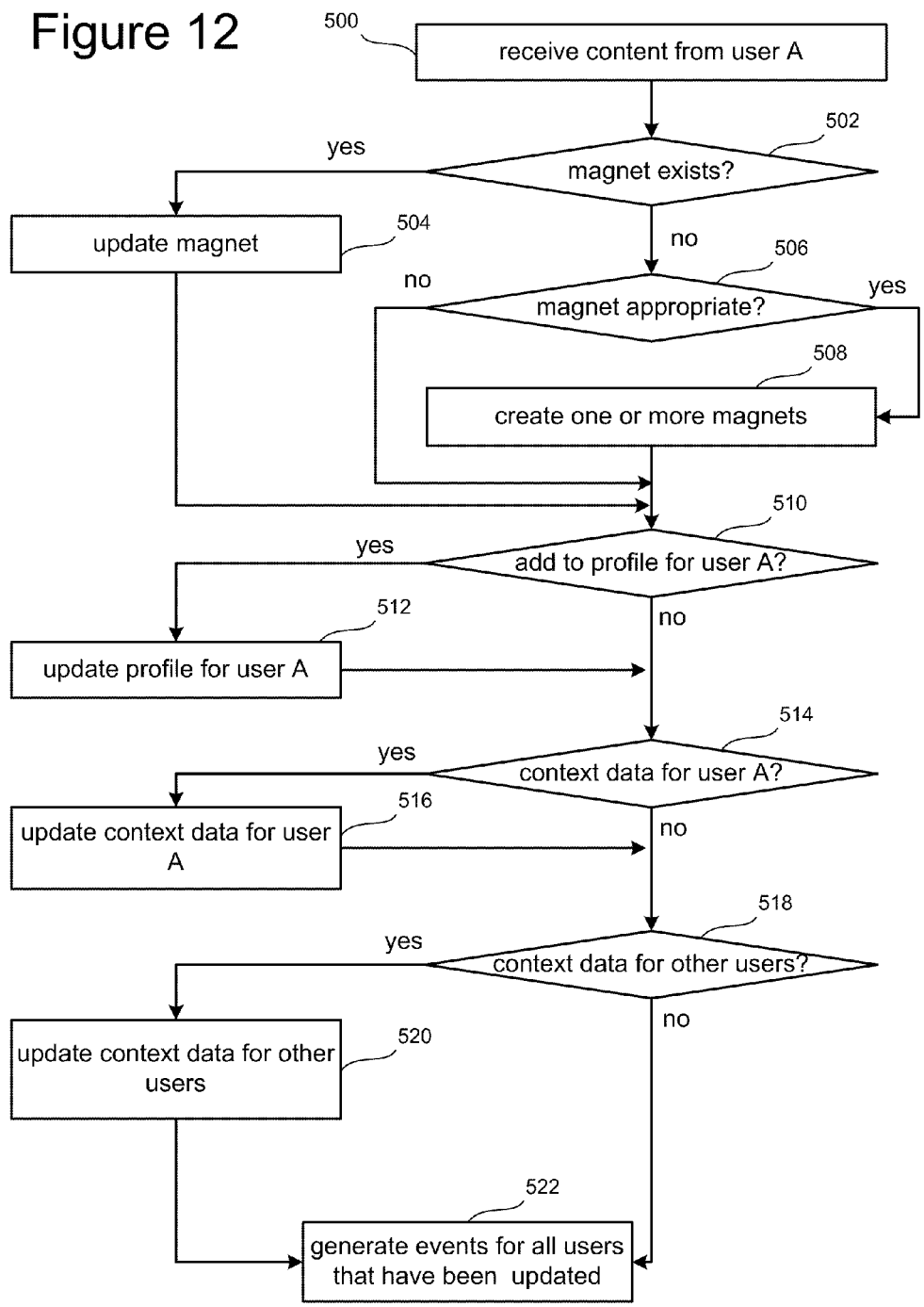

CONTEXTUAL BASED INFORMATION AGGREGATION SYSTEM

BACKGROUND

With the widespread adoption of the Internet, more people have access to more information than ever before. For example, people can track friends, musical groups and public figures on social networking sites, websites that aggregate content, and online communities. People can remain current with topics of interest via RSS feeds, content aggregating web sites and blogs. When information is not immediately available or when shopping, users turn to Internet search engines. Additionally, many events, sellers of goods and services will advertise on the Internet. Despite all of these sources of information, people still miss events and experiences that they would have wanted to participate in.

SUMMARY

A system automatically and continuously finds and aggregates relevant and current information about the people and things that a user cares about. The information is filtered based on current context (e.g., where the user is, what the user is doing, what the user is saying/typing, etc.) and/or topics of interest to the user. The result of the information gathering is presented ubiquitously on user interfaces at any of the various physical devices operated by the user.

One embodiment includes receiving (at a server system) indications of topics of interest from a first client, automatically gathering content about the identified topics in response to receiving the indications, receiving context information at the server system from the client, identifying a subset of the gathered content based on the received context information, and reporting the identified subset of the gathered content.

One embodiment includes a network interface in communication with a global network, a storage device and one or more processors in communication with the network interface and the storage device. The one or more processors gather content related to multiple topics in response receiving indications of the multiple topics from a client. The one or more processors identify a subset of the gathered content related to an indication of context received from the first client. The one or more processors report the identified subset of the gathered content.

One embodiment includes one or more processor readable storage devices having processor readable code embodied on the one or more processor readable storage devices. The processor readable code programs one or more processors to perform a method that comprises identifying one or more topics of interest for a first user, transmitting the one or more topics of interest to a remote computing system, automatically obtaining first context information for the first user, automatically transmitting the first context information to the remote computing system, receiving content from the remote computing system based on current context information and reporting the received content to the first user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 is a block diagram of one embodiment of the hardware components in a system that automatically and continuously finds and aggregates relevant and current information about the people and things that a user cares about based on current context, and reports that information to the user.

FIG. 3 is a block diagram of one embodiment of software components that automatically and continuously find and aggregate relevant and current information about the people and things that a user cares about based on current context, and report that information to the user

FIG. 5A is a logical block diagram depicting one embodiment of the software components that automatically and continuously find and aggregate relevant and current information about the people and things that a user cares about based on current context, and reports that information to the user.

FIG. 7 is a flow chart describing one embodiment of a process for a client obtaining data in an interactive manner.

FIG. 8 is a flow chart describing one embodiment of a process for a client obtaining data in an active manner.

FIG. 9A is a flow chart describing one embodiment of a process for a client obtaining data in a passive manner.

FIG. 9B is a flow chart describing one embodiment of a process for a client obtaining data in a passive manner.

FIG. 10 is a flow chart describing one embodiment of a process for a client reporting to a user.

FIG. 11 is a flow chart describing one embodiment of the operation of a magnet.

FIG. 12 is a flow chart describing one embodiment of a process for a server receiving information from a client.

DETAILED DESCRIPTION

A system is disclosed that will learn and identify the topics and places a user is interested in, the people in the user's social network, the user's demographics and browsing history, and contextual information about where the user is, who the user is with and what the user is doing. A service connected to the cloud (e.g., the Internet) constantly evaluates that information and gathers relevant content available on the Internet (or other sources) that the user will find interesting. The gathered information is filtered based on the user's context. This filtered information is pushed to the user as part of a user experience on any of the devices the user operates. The user experience may vary from screen-to-screen, but the data it displays will be the same (or close to the same). The system provides advantages over other data discovery systems in that content is gathered from many different types of sites, filtered automatically based on context and provided to the user based on interaction across many of the user's different types of computing devices.

Figure 1:
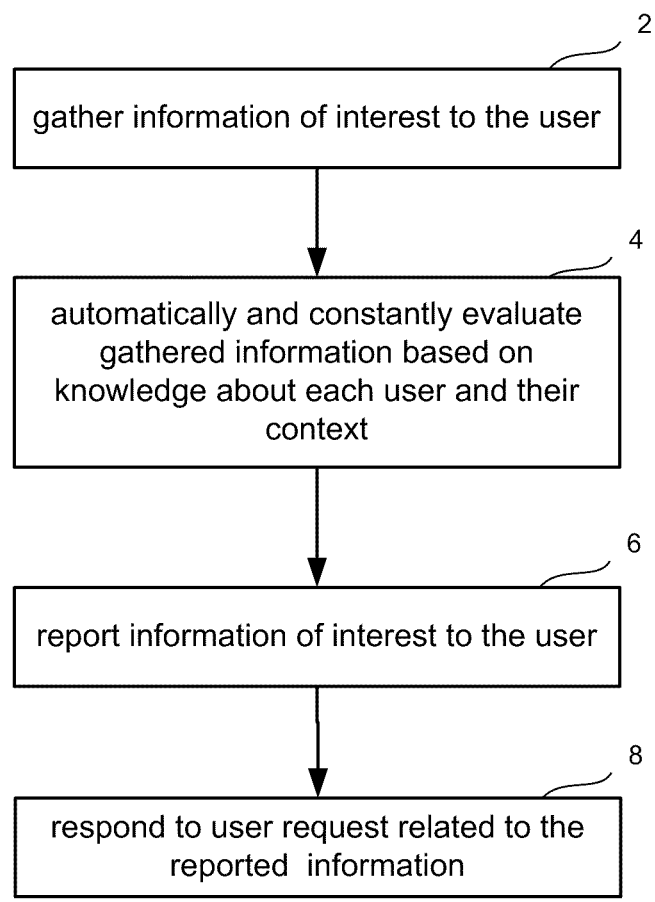
FIG. 1 is a flow chart describing one embodiment of a process for automatically and continuously finding and aggregating relevant and current information about the people and things that a user cares about based on current context, and reporting that information to the user.

A system is disclosed that automatically and continuously finds and aggregates the most relevant and current information about the people and things that a user cares about based on current context and reports that information to the user ubiquitously on a user interface at any of the various physical devices operated by the user. FIG. 1 provides a high level flow chart describing such a system. In step 2 of the process of FIG. 1, the system automatically and constantly gathers information of interest to the user (e.g., current information about the people and things that a user cares about). In step 4, the system automatically and constantly evaluates and filters the gathered information based on knowledge about each user and their context. In step 6, information that the system determines to be of interest to the user is reported (e.g., pushed) to the user. In step 8, the system will respond to a user request regarding the information (if the user makes such a request). For example, the user may request additional information about what was reported or the user may request additional information about a topic that was reported. For example, if the system reports that a particular object the user has been shopping for is available at a nearby store, the user may request further information such as directions to the store and store hours. The system would then provide a map and/or directions with the relevant information about the store.

Consider the following example. A first woman is on a bus watching a video on her mobile computing device (e.g. cell phone, tablet, laptop, etc.). While watching the video, the first woman notices shoes she likes on a second woman sitting across the aisle on the bus. The first woman snaps a photo of the shoes using her mobile computing device, without the second woman noticing. That photo is provided to the system described herein. The system identifies the exact make and model of the shoes, as well as where to buy them. That information is all provided to the first woman on her mobile computing device. The first woman then resumes watching the video. Later on, as the bus gets closer to a department store, the system (using GPS or other tracking technology), will identify that the first woman is near the department store and that that department store is having a sale on the shoes of interest. The mobile computing device will display an alert (or sound an alert) to the first woman. When the first woman selects the alert (e.g. taps an icon, pushes a button, etc.), a message is provided on the display screen of the first woman's computing device indicating that the store nearby is having a one day sale on the shoes she is interested in. In response to this information, the first woman gets off the bus at the appropriate bus stop and purchases the shoes. She is happy.

In another example, a first man who plays in a band is having a show at a theater. He discloses his show on his social networking page. The service described herein will pick up that disclosure of the show and provide that information to all users who have a connection to the first man, regardless of whether they visit the first man's social networking page. For example, a friend of the first man is home on the couch and receives an alert on her telephone that the first man is playing at the theater tonight. The system also tells the fiend that a second friend is at that theater streaming live video of the show, so she clicks on the link for more data and gets the live video. When the system sees her streaming the live video from the show, it immediately calculates how she can go to the show using public transportation (her known preferred transportation method) and provides her that information automatically on her cellular telephone. In response, the woman goes to the show and a boring night is averted.

More details of one embodiment of a system that can perform the above described functions is now provided. FIG. 2 is a block diagram depicting one embodiment of components that can be used to perform the functions described herein. The block diagram of FIG. 2 shows cloud 10 which can be the Internet, another global network, or other type of network or communication means. A set of computing devices are in communication with other components via cloud 10. These computing devices include cellular telephone 12, television (or set top box) 14, desktop computing device 16, mobile computing device 18, game console 20 and automobile 22. Computing devices 12-22 are examples of multiple computing devices that can be operated by a particular user. Other computing devices can also be used with the technology described herein. The user can interact with various entities via cloud 10 using any of the devices 12-22.

Also in communication with cloud 10 is system 30, which automatically and continuously finds and aggregates the most relevant and current information about the people and things the user cares about based on the current context and reports that information to the user ubiquitously on a user interface on any of the user's devices 12-22. In one embodiment, system 30 includes one or more servers. The number of servers used to implement system 30 is not a requirement, and is based on bandwidth, demand, performance of the servers and other factors that are implementation specific. In one example, system 30 is implemented by multiple server farms. The system of FIG. 2 also shows friends and family devices 42, 44, 46 and 48. These can be any computing device (e.g. cell phone, television, desktop computing device, mobile computing device, game console, automobile, etc.) used by a friend of a user or a family member of a use. Although FIG. 2 show four friend/family devices, more or less than four family devices can be utilized. It is contemplated that a user may have many friends and family members that the user is interested in; therefore, there will be many more than four friend/family devices that are relevant to the discussion herein. Another note is that FIG. 2 shows that devices relevant to one particular user (the user device and the user's friend/family devices). However, a system implemented is likely to be in communication with devices for many users (e.g. many thousands of users).

In operation, user will use any of devices 12-22 (at different times or concurrently) in order to perform various tasks (e.g., work, entertainment, social, etc.). While operating these devices, the user will indicate topics of interest and software in these devices will sense (manually and automatically) contextual information for the user. The system will also sense topics of interest based on user behavior. If a person goes to baseball websites a lot, the system may assume the person likes baseball. The information about topics of interest and context is sent to system 30 which uses the information received for further searching, aggregation and/or filtering of data in order to identify that data to the user via any of the devices 12-22. The information sent to system 30 is also used to create a digital history for the user. In addition, it is used to make the system smarter, so the system can learn more about the user and improve the relevancy of the information that is pushed. FIG. 3 is a block diagram depicting one embodiment of the software components that enable the automatic and continuous discovery, aggregating and filtering of relevant and current information for the user. FIG. 3 shows user devices 60 and 66 associated with a user, which can be any of devices 12-22 (as well as other computing devices). Although FIG. 3 only shows two user devices, it is contemplated that the system can be in contact with more than two user devices. Each user device will have a client software module (e.g. client module 62 on user device 60 and client module 68 on user device 66), which will be in communication with interface software 72 of system 58. Interface software 72 is used to communicate with the client modules. System 58 is one example embodiment of aggregation system 30.

System 58 also includes magnets 74, controller 76, recommendation engine(s) 78 and search engine(s) 80. Magnets 74 are software processes that automatically and continuously collect information about a topic of interest (e.g., person, place or thing). For example, magnets look for content (via cloud 10) relative to a seed (e.g., topic or specific content). For example, if a magnet is provided with a seed topic (e.g. a type of shoes, musical group, a subject matter, etc.) then the magnet will search the Internet (or other source) to find information available that is related to that seed. What makes the magnet different from a typical Internet search engine is that magnets are persistent, personalized based on what the magnet know about the person, has some contextual aspects, can interact with other magnets, can show many types of content (games, music, tweets) from both public and private indexes, and the content that is returned has context (such as returning a place and saying who else is there).

Magnets could have their own user interface just for interacting with magnets (to get information on a specific topic). For example, a user can interact with a magnet vi a user interface (e.g., touch screen) to set up, configure and see results of a magnet. If a users pulls two magnets near each other (e.g., on a user interface), they'll effect each other. For example, a person pulls their restaurants magnet near their New York magnet on a touch screen display, and in response the two magnets interact and output an intersection of the topics being searched (e.g., restaurants in New York).

Magnets can also be "pruned." For example, a user may personalize a magnet about a singer to show fashion, music, and gossip, but never anything jail-related.

In one embodiment, magnets are virtual objects that attract similar particles, customized for a person and the person's context. A magnet is centered on a topic or interest. It attracts a collection of particles related to that topic, filtered and prioritized based on the profile of the person who owns the magnet and their current context (time, location, device, who you're with).

A particle is a statement or suggestion. A statement particle consists of a small amount of textual information such as "Stocks are down right now" or "Mom's birthday is tomorrow." A suggestion particle consists of a link to some digital content such as "Karma Club DJ Night" or "Halo 2." Suggestion particles send you somewhere (i.e. find out the full Karma event details, or go play the game). All particles can be acted upon. A user can magnetize a particle, give feedback on a particle, hide, or save a particle. Particles can have value and actions. Examples of values include a Pointer to the actual content, metadata (type, format, thumbnail), pizzazz (surpassing a relevance threshold, it gets pizzazz, which draws attention to it), and relevance (the system figures out the relevance and applies these values). Examples of actions includes "Go to the content," "Magnetize this (have it attract similar particles, basically turning it into a temporary magnet," "Give Feedback on this (thumbs up, thumbs down)," "Hide this (make this go away)" and "Pin this, so I can get back to it." Other values and actions can also be included. Magnets attract particles related to a particular subject or interest. Digital History is a trail of particles that a person acted upon or viewed at some point in the past. Aggregation system 30 shows the most relevant particles based on current context (location, time, who a person id with, device, activity, intent, etc.).

Looking back at FIG. 3, search engine 80 is used to search various sources available via cloud 10. In one embodiment, magnets 74 use search engine 80 to search. In other embodiments, magnets 74 and search engine 80 will search independently for information. Recommendation engine 78 will provide recommendations of information for a user based on the results from magnets 74 and search engines 80.

Controller 76 acts as the central brain that coordinates the operation of interface 72, magnets 74, recommendation engines 78 and search engines 80. In operation, topics of interest and context information will be received at interface 72 and provided to controller 76. In one embodiment, controller 76 will provide the topics/and or context information to magnets 74, recommendation engine 78 and search engines 80 in order to obtain additional data and/or to filter data already found. In some embodiments, magnets 74, recommendations engines 78 and search engines 80 will provide all of the data to controller 74 which will filter the data based on the context information and provide the result of the filtering to the appropriate client module (62 or 68) via interface 72. In some situations, the information is reported to the user on the same device/client that provided context information to system 58. In other situations, the context information is provided to system 30 from a first device associated with the user (e.g., device 60) and the information from system 30 is pushed to a second device associated with the user (e.g., device 66) because the user has changed the device the user is working with or the second device is a more appropriate platform to report the information.

In one embodiment, the software developer that creates (or operates) system 30 will also create (or otherwise distribute) client modules 62 and 68. In another embodiment, system 30 will include an application program interface (API) so that many different entities can develop client module that can interact with system 30.

Figure 4A:
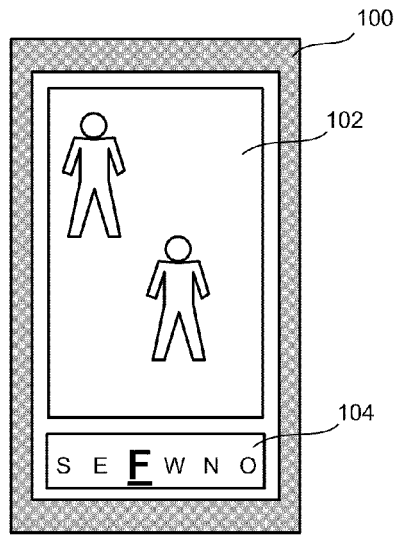
FIGS. 4A-F depict various embodiments of a user interface on a client device.

There are many ways for alerting the user of that system 30 has information to report. FIGS. 4A-4F depicts various embodiments of a user interface on a client device that can report that there is no information for the user. For example, FIG. 4A shows a mobile computing device 100 with a display showing two windows 102 and 104. The user is watching a video in window 102. A set of indicators (e.g., icons) are displayed in window 104. Each icon represents various types of content. For example, indicator S represents content related to shopping, indicator E represents content related to entertainment, indicator F represents content related to family and/or friends, indicator W represents content related to work, indicator N represents content related to news, and indicator O represents other types of content. When system 30 pushes content to device 100, the appropriate indicator (e.g. S, E, F, W, N or O) will be highlighted to indicated that new content has been pushed for the category. For example, FIG. 4A shows F being highlighted by bolding and underlining F. A user can tap on the "F" in order to bring up a window showing the newly pushed content.

Figure 4B:
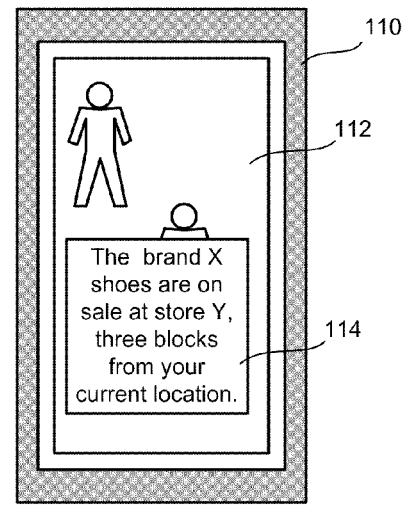

FIG. 4B shows mobile computing device 110 with window 112 showing a video. While showing the video, system 30 will push new content to device 100. Rather than show a set of indicators as depicted in FIG. 4A, the new content will be automatically displayed in a window 114 ("The brand X shoes are on sale at store Y, three blocks from your current location.") above the video.

Figure 4C:
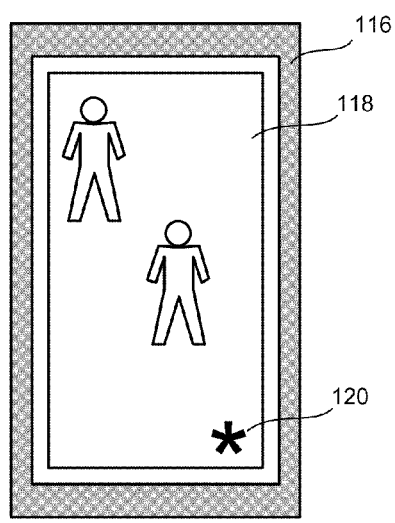

FIG. 4C shows another embodiment, which includes mobile computing device 116 with a window 118 showing a video. When content is pushed to mobile computing device 116 by system 30, an indicator 120 will be displayed in a portion of the display screen. The user can tap on the indicator 120 and a window (similar to window 114) will be displayed indicating the new content.

Figure 4D:
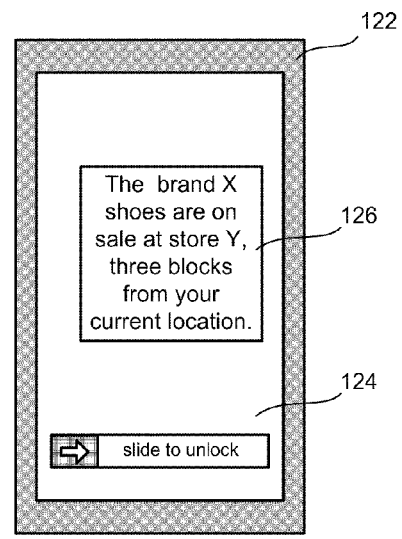

FIG. 4D shows another embodiment, which includes mobile computing device 122 with an unlock screen 124. For example, when a computing device is not used for a long time or is otherwise put in a sleep or hibernate mode, the system will enter an unlock screen when the user wants to activate the device again. In order to operate the device, the user must unlock the device from the unlock screen. For example, unlock screen 124 includes a slider which be moved from left to right in order to unlock device 122. When the user accesses the unlock screen, the latest content pushed from system 30 to device 122 will be displayed in window 126. Similarly, a television can be configured to show the latest content pushed from system 30 when the television is first turned on or between shows/movies.

Figure 4E:
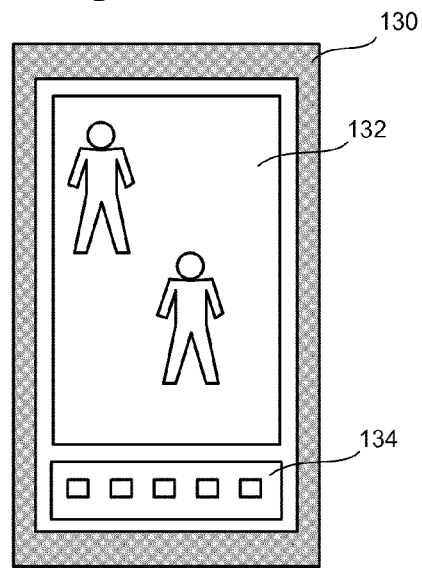

FIG. 4E shows a mobile computing device 130 with a display showing two windows 132 and 134. The user is watching a video in window 132. A set of icons are displayed in window 134. Each icon represents people, places, or things (interests) with current activity. FIG. 4E shows the icons as squares; however, the icons can be images of the people, places, or things they represent. For example, an icon represent a friend can be a thumbnail photo of the friend. An icon represent a band can be the logo of the band.

Figure 4F:
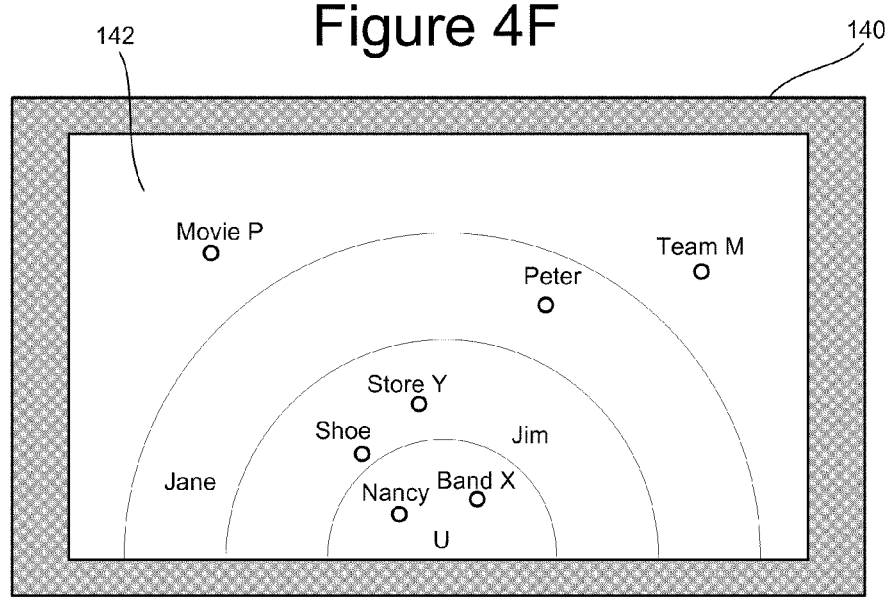

FIG. 4F shows a mobile computing device 140 with a display 142, which can be a touch screen or other type of display. As depicted in FIG. 4F, display 142 shows a radar-like screen. Plotted on the radar are circles and text represent people, places or things for which system 30 has delivered new information. The U represent the user. The closer an item is to the U, the more relevant the system 30 thinks the item is.

FIGS. 4A-4E provide six examples of alerting a user of new content pushed from system 30 to a mobile computing device. These are just a small set of examples of possible user interfaces. No particular user interface is required for the technology described herein. Many different types of user interfaces can be used with the technology described herein. For example, other embodiments include sending a text message alert, or pop something up on a "ticker," which is an unobtrusive UI that runs in the background showing a few of the interesting items found. Additionally, there can be multiple views of the information pushed to the mobile computing device: a timeline view, a map view, a list view, a collage view, etc.

FIG. 5A is a block diagram depicting another embodiment of the software components that enable the automatic and continuous discovery, aggregating and filtering of relevant and current information for the user. System 150 of FIG. 5A is another embodiment of Aggregation system 30 of FIG. 3. System 150 can be implemented by one or more computers. Data will be acquired by system 150 from many different input sources, such as databases 152, sensors 154, (e.g., cameras, temperature sensors, GPS sensors, other positional sensors, etc.), web sites 156, event stores 158, news sources 160 and web servers 162. Other sources can also be used (e.g., social networking systems, communication systems, data warehousing systems, etc.). Data from these sources are provided to one or more input adaptors 164 which obtain the data, scrub the data, reformat the data and provide it to one or more appropriate standing queries 166, 168, 170, . . . . In one embodiment, standing queries 166, 168, 170, . . . correspond to magnets 74. When a standing query identifies information relevant to the query, a database record will be generated with information about what was found from the input source. This generated database record is an event for the system of FIG. 5. That database record is stored in database 172.

In response to an event, intelligent processing module 174 will obtain appropriate data in data store 172, user profile data 176 and context data 178. The user profile data can be information about a user such as demographic information, behavioral information, etc. Context data is current context data about the user, about the user's friends/family, or about persons the user is interested in, etc. Examples of context data include the location of an entity, what an entity is doing, what device the entity is interacting with, who the entity is interacting with, what the entity is saying, time of day for the entity, current persona of the entity (e.g., parent, employee, spouse, coach, commuter, etc.). Intelligent processing 174 (part of controller 76) will evaluate the information described above and identify information of interest to a particular user based on that evaluation.

In one embodiment, there's a secondary form of intelligent processing that takes the user profile data, their history, behaviors, (and possibly everything known about them from using properties like email, messenger, Internet searches), and combines that data together to make intelligent inferences. For example, the inference engine would figure out that a person is a finance guru and not that interested in sports. Some things it knows for sure since the person created a magnet on it, and other things it figured out. Each of these things its think about the person will have values for how interested the system thinks the person is in the topic and how high its confidence level is that the person is interested. For example, something we have figured out would have a lower confidence level than something you explicitly told us. This could be an asynchronous process since it has so much data to go through. It has one more aspect in that it looks across users to make inferences. For example, if other people with similar behaviors or profiles all like a certain band, then the system may want to recommend that band (with a lower confidence).

Any information that intelligent processing 174 believes would be interesting to a user will be sent to output adaptor 180 which will adapt the data for the particular target mobile computing device. The targets shown in FIG. 5A include cell phone 186, television (or set top box) 188, desktop computing device 190, mobile computing device 192, game console 194 and automobile 196 (which correspond to user devices 12-22). Other targets can also be utilized. Output adapters 180 will package the data for the appropriate target and communicate using the appropriate protocol. In one embodiment, input adapters 164 and output adapters 180 are part of interface 72. Additionally, intelligent processing 174 may utilize one or more recommendation engines and/or search engines.

Any one or more of the components of FIG. 5A can be created in an object oriented manner so that the system can process many different users concurrently. In such an embodiment, the system will create an instance of itself for each of multiple users. A single instance is associated with one or more mosaic identity facets and other contextual data that is used as the central point or the foci in the stream processing. As an example, one instance can be centered on a Facebook identity, another on a corporate identity, and a third on a combination of them. An instance can also be configured with a group of different facets as its focus.

Figure 5B:
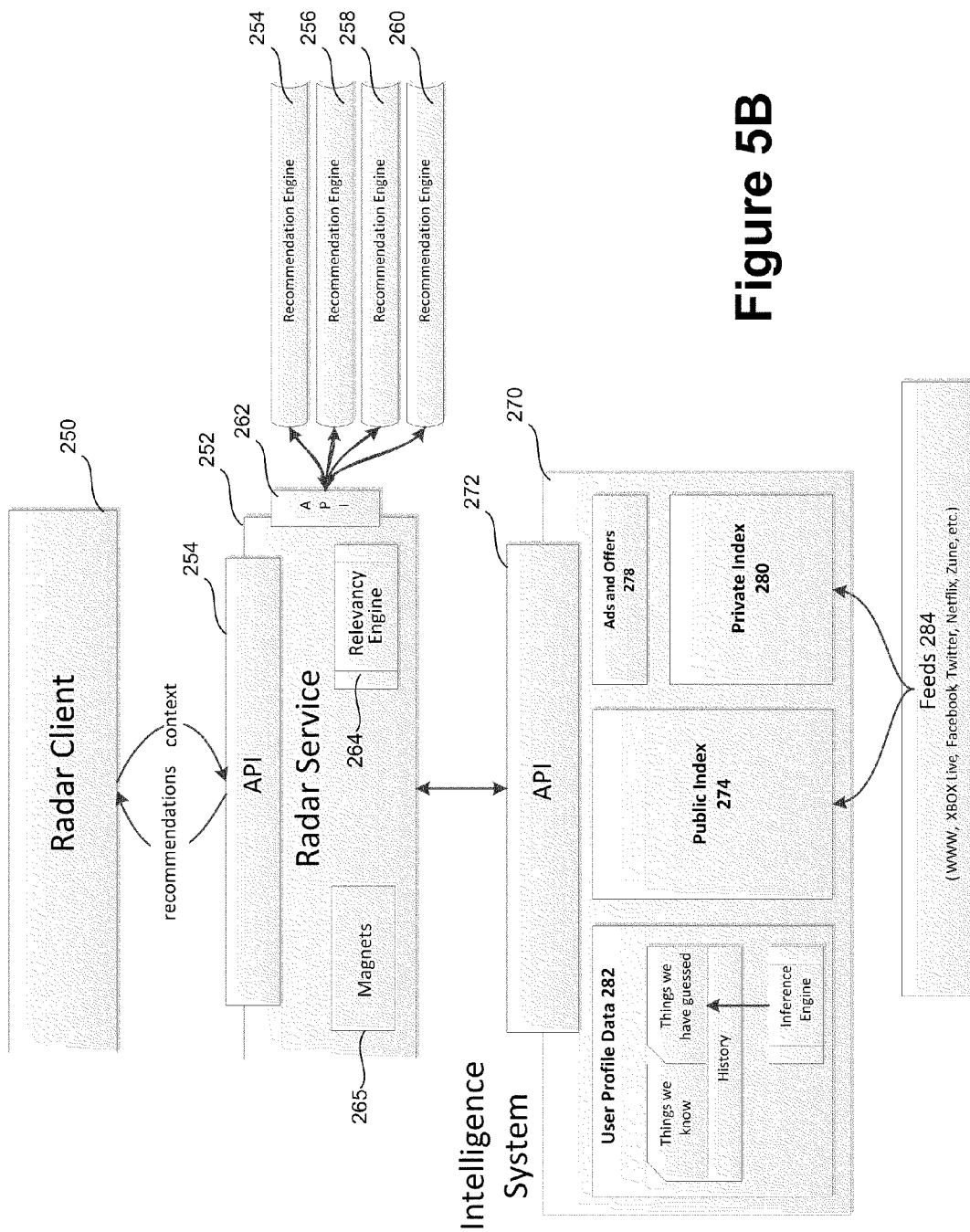
FIG. 5B is a logical block diagram depicting one embodiment of the software components that automatically and continuously find and aggregate relevant and current information about the people and things that a user cares about based on current context, and reports that information to the user.

FIG. 5B is a block diagram depicting another embodiment of the software components that enable the automatic and continuous discovery, aggregating and filtering of relevant and current information for the user. The components of FIG. 5B, other than Radar client 250, is another embodiment of Aggregation system 30 of FIG. 3. Radar client 250 is software running on any of the physical computing devices of a user (e.g., the devices 12-22 of FIG. 2) FIG. 5B shows Radar client 230 in communication with Radar Service 252 via an Application Program Interface (API) 254. Radar Client 250 provides context information (and, optionally, information about a user's interest) to Radar Service 252 and receives back recommendations of things of interest to the user. The received recommendations of things of interest to the user can be reported of the user as discussed above (see e.g. FIGS. 4A-4F).

Radar Service 252 includes an API for a set of recommendation engines 254, 256, 258 and 260, each of which makes different types of recommendations for different types of content. For example, one recommendation engine may make recommendations for music, another for shopping, another for parties, another for restaurants, etc. A system can have more than four recommendation engines. Radar Service 252 includes magnets 265, which are discussed above, and a Relevancy Engine 264. Magnets make use of the recommendation engines to identify content for a user. Additionally, recommendation engines can make recommendations without a magnet involved. Magnets use the Intelligence System API to mine the world of knowledge for information that will be useful to a specific user interested in a specific topic. Magnets use the Recommendation Engines to make interesting recommendations for the specific user about the specific topic. Recommendation Engines make use of the user's context and Intelligence System API to make interesting recommendations for a specific user based on their current context and user profile. All information and recommendations made by both Magnets and Recommendation Engines are then sorted by the Relevancy Engine and provided to the Radar Client.

Magnets make use of the recommendation engines to identify content for a user and the Relevancy Engines scores each item of content based on its perceived relevancy. In one embodiment, Relevancy Engine 264 provides a numerical relevancy score based on how pertinent the item content is to the current context of the user. For example, a restaurant recommendation may get a higher relevancy score between 3-5 PM, then at midnight. Similarly, information about a football team may receive a higher relevancy score during the football season than between seasons. Information about a person the user is with or about to meet, will get a higher score than other people. Information about a band the user is listening to, will get a higher score. Information about shoes a user just took a photo of will get a higher score.

Radar Service 252 communicates with Intelligence System 270 via an API 272. Intelligence System 270 creates, obtains and stores information about data available to Radar Service 252. In one embodiment, Radar Service 252 is implemented by a set of computers (e.g., a server farm) and Intelligence System 270 is implemented by a different set of computers (e.g., a server farm). In other embodiments, one or more of the same computers can implement both Radar Service 252 and Intelligence System 270.

Intelligence System 270 includes Public Index 274, Ads and Offers store (or index) 278, Private Index 280 and User Profile Data 282. Public Index 274 is a Internet Search index of web sites on the World Wide Web. Private Index 280 includes a separate index of private sites for each user. For example, each user will have a private index that provide information about their social networking pages, email, contacts, etc. Ads and Offers store provides a list (with a pointer to or the actually content) of all advertisements and offers to consumers that are available. User Profile Data 282 provides information known and guessed for each user. In one embodiment, User Profile Data 282 includes an inference engine, which is software that guesses information about users based on their behavior. The inference engine can provide context information for a user that includes intent of the first user derived from an inference based on an action of the first user. For example, if a user is reading about a restaurant, the inference engine may assume the user is desiring to eat (e.g., the user is hungry). The response may be to show the user restaurants nearby that serve the food the user was observed to eat in the past. Public Index 274, Ads and Offers store (or index) 278, and Private Index 280 are created based on crawling or searching on the World Wide Web, social networking systems, collaborative services, multiplayer game services, search engines, and/or other networks or sources (see Feeds 284).

In operation, magnets 265 will utilize the recommendation engines, Public Index 274, Ads and Offers store (or index) 278, Private Index 280 and User Profile Data 282 to identify content of interest to the user. Relevancy engine 264 will be used to provide a relevancy score for the items found based on the user'c current context. Items of content closest to the user's current context will given a higher score. Items with the higher scores will be pushed to Radar Client 250 by Radar Service 252.

Figure 6:
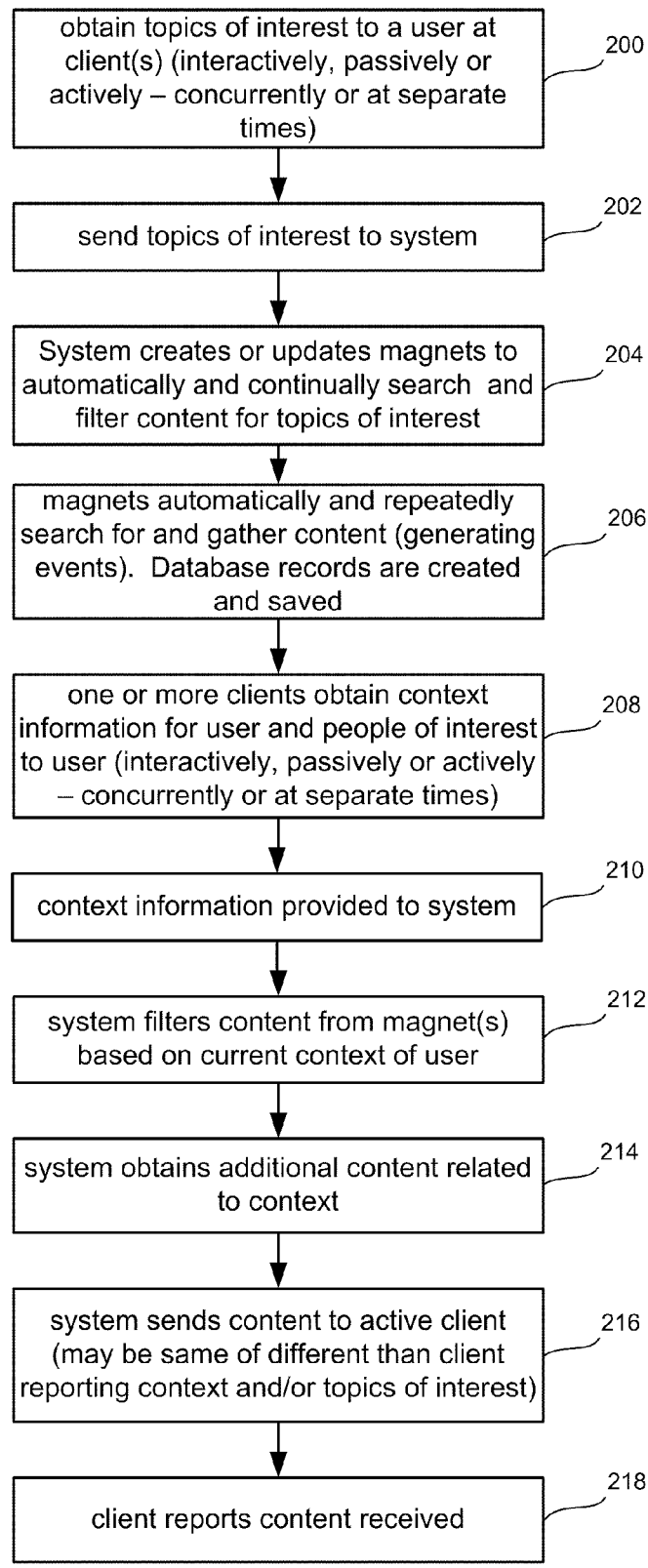
FIG. 6 is a flow chart describing one embodiment of a process for automatically and continuously finding and aggregating relevant and current information about the people and things that a user cares about based on current context, and reporting that information to the user.

FIG. 6 is a flowchart describing one embodiment of the operation of the system described above for automatically and continuously finding and aggregating the most relevant and current information about the people and things that a user cares about, filtering based on current context, and reporting/pushing that information to the user. In step 200, a client module will obtain topics of interest to a user. The client module can obtain this information interactively, passively or actively, or a combination of the above, concurrently or at separate times. More information about obtaining topics of interest will be provided below. In response to interacting with or observing the user, the client module will generate topic data and communicate that topic data to a server that is part of system 30 in step 202.

In response to receiving the topics in step 202, system 30 will create a new magnet or update an existing magnet (or other software component) in step 204 to automatically and continually search and filter content for the topics of interest without the user requesting that the content be gathered. If the topic of interest is something new, a new magnet is created by creating new criteria and starting a process to search the internet or other space for content related to that new criteria. If the topic received in step 202 is similar to the focus of an existing magnet, the existing magnet can be changed to modify its focus based on the new topic. In step 206, the magnets will automatically and repeatedly search and gather content related to the seed for each magnet. For example, the magnets may identify events or news relevant to one or more of the topics. Although FIG. 6 shows the steps in a particular order, these steps can be performed in other orders. In one embodiment, step 206 is performed continuously; therefore, it is performed before, after and during many of the other steps of FIG. 6.

In step 208, one or more client modules will obtain context information for the user associated with those client modules and for people of interest to the user. The context information can be obtained interactively, passively or actively (concurrently or at separate times). The context information obtained in step 208 is provided to the system 30 in step 210. For example, the information is transmitted to a server that is part of system 230. In step 212, system 230 will filter content from one or more magnets based on the current context information provided in step 210. It is contemplated that the various magnets associated with a user will search for and identify a large amount of information. The current context information can be used to filter that information to a smaller subset. For example, if a magnet is searching for information about shoes, and current context information indicates the location of a user, the information about shoes can be filtered to only provide information about shoes sold in a store geographically close to the user. In step 214, additional information can be searched for and aggregated that relates to the context information that was not otherwise captured by any one of the magnets. In step 216, the information identified in step 212 (and, possibly, in step 214) is used to create an output message and that output message is sent to a client for the user.

The content is sent to whatever client(s) is/are active for the user. In some instances, the client that sent the interest information and/or sent the context information is the client that is currently active and, therefore, the result data will be sent to the same client. In other embodiments, the user will be interacting with a first client device when the context information is sent to system 30 and interacting with a second device when the result is reported back. Therefore, the result was reported to a different client device which may be a completely different type of device. For example, a user may be playing a game console when information is sent to system 30 and be using the cellular telephone when information is sent back. Therefore, the information will be packaged for the user's cellular telephone rather than the game console. In step 218, the client device that received the data in step 216 will report the new content in step 218, as described above or in any other suitable manner. More information about many of the steps of FIG. 6 will be provided below with respect to FIGS. 7-13.

FIG. 7 is a flowchart describing one embodiment of a process for a client module obtaining data interactively from a user and providing that data to system 30. The process of FIG. 7 can be used to obtain topics of interest to a user and sending it to system 30 in step 200 or for obtaining context information in step 208 for communication to system 30. In step 302 of FIG. 7, the user will explicitly indicate content of interest. For example a user may take a photo and request information about that photo, select a photo from existing photos on the user's computing device, speak a keyword, type a keyword, highlight a keyword in a document, select content on the computing device, etc. In any of these cases, the user is purposely choosing to identify content that the user wants more information for. This information may be a topic of interest. In some embodiments, the information can also provide context. In step 304, the content of indication of content from step 302 is sent from the client module to system 30 (e.g. to one or more servers that implement system 30).

FIG. 8 is a flowchart describing one embodiment of a process for client module obtaining data (e.g., context data or topics of interest) actively. This process can be used as part of step 200 or step 208. In step 240 of FIG. 8, a client device will perform a function requested by the user. For example, the client device will load a web page, implement a telephone call, implement a text message, send an e-mail, play a game, chat, interact with a social networking site, or perform some other function. In step 342, a client module will report the function being performed to the system 30. In step 344, the client module will report the result of the function to system 30 also. For example, if the user is playing a game, the result of the game will be reported. If the user is making a phone call, the result of the phone call (who the user called and whether the user ever made contact) can be reported to the system and the system uses this information both to create a digital history for the user and to refine what we know about the user, make the system smarter, and ultimately give better results. 30.

FIG. 9A is a flowchart describing one embodiment of obtaining data (e.g., context data or topics of interest) passively. The process of FIG. 9A can be performed part of steps 200 or 208 of FIG. 6. For example a cellular phone knows who the user is and where the user is located. A smart phone will know if the user is in a meeting and what the meeting is about. The smart phone could also be listening in, finding key words from speech patterns and providing those key words to system 30 to perform Internet searches based on those key words. So when a user and the user's friend are talking about a favorite sports team, statistics about that team can automatically be displayed on the cellular telephone. The client device can access applications on the client device for obtaining the data. Alternatively, the client module can access various sensors in the client device directly. In step 360, the client module will access applications on the client device for current state information. For example, if there is GPS or mapping software running on the client device, the client module can access the location software to obtain the current location of the mobile computing device. Similarly, an e-mail application can be accessed to identify currently received e-mails. In step 362, the client module will access sensors on the client device for current conditions. For example, the client module may access an orientation sensor, microphone, light sensor, temperature sensor, etc. on the client device to obtain various conditions of the environment that the user is currently in. In step 364, the state information from step 360 and the current conditions from step 362 are transmitted to system 30 with identification information for the client device. For purposes of this document, when data is transmitted, it is usually first used to create a message and that message is then transmitted. Note that the process of FIG. 7 is performed interactively with the user. However, the processes of FIGS. 8 and 9A are performed automatically without a request by the user to have the data sent.

FIG. 9B provides one example of an implementation of the process of FIG. 9A. In step 380, a client module will access a calendar application in a smart phone. For example, the client module will determine from the calendar application that the user is at a meeting with person A and person B. However, in this example, the meeting information in the calendar application does not identify the location. In step 382, the client module will access a GPS location application to determine the location of the user. Note that steps 380 and 382 are examples of step 360 of FIG. 9A. Steps 384-388 are examples of step 362 of FIG. 9A. In step 384, the client module will access a motion sensor in the smart phone to determine whether the user is moving. In step 386, the client module will utilize a microphone in the smart phone to listen to a conversation at the user's location. The device will perform text to speech in order to create searchable text. From the searchable text, the device will attempt to identify key words. The key words identified in step 386, along with the indication of motion, the location of the client device and the indication of the meeting obtained from the calendar will all be packaged into a message that is created and transmitted to system 30.

FIG. 10 is a flowchart describing the operation of a client module (e.g., client module 62 or client module 68) when it receives result information from system 30. That is, the processes of FIGS. 7, 8 and 9A are used to send topics of interest and context information up to system 30 from a client module. Based on that information received at system 30, system 30 will identify information of interest to the user and push that information back to the client. The process of FIG. 10 describes the actions performed by the client module when the client module receives that information pushed back to it by system 30.

In step 400 of FIG. 10, the client module will receive content from system 30 without the user requesting that content. In step 402, the client module will alert the user about the new content. Again step 402 is performed without the user requesting the content. Examples of providing alert are discussed above with respect to FIGS. 4A-F. In step 404, the client may (optionally) receive a selection of the alert from the user. If so, the content associated with the alert, which was received in step 400, is displayed in step 406. For example, step 402 may include displaying alert 120 of FIG. 4C and step 406 may include displaying window 126 or window 114 of FIG. 4B or 4D. In step 408, the system may receive a request from the user for additional information. For example, in one embodiment, the content is displayed with a link for the user to request more information. If the user selects that link, then in step 410 the system will obtain or report the additional information. For example, if the user wanted more information about window 126 of FIG. 4D, in response to the user selecting the window a client module may inform system 30 that more information is requested. In response to the request for more information, the system 30 may provide explicit details for the user to navigate to the store having the sale; for example, providing directions on taking public transportation, providing driving directions, etc. Alternatively, step 408 may include the user selecting one of the circles depicted in the UI of FIG. 4F.

As described above, magnets are software processes that search for content relative to a seed. When content is found, the magnets will create a database entry and generate an event associated with that database entry. The database entry will then be stored and the event will trigger the filtering described above. FIG. 11 is a flowchart describing one embodiment of the process performed by the magnets to generate these events. In step 450 of FIG. 11, one or more magnets will search for content based on a seed topic, such as the topics of interest to the user, as described above. In step 452, the magnet will identify content. An event is generated in step 454, the content identified will be used to create a database entry and that database entry will be stored. As describe above, that data will then be used as part of a filtering process to potentially identify data to be pushed to the user.

FIGS. 7, 8, and 9A describe sending topics of interest and user context data to system 30. FIG. 12 is a flowchart describing another embodiment of a process performed by system 30 in response to receiving that information. For example, the process of FIG. 12 is one example of performing steps 204 and 212 of FIG. 6. In step 500, the system will receive content from a user A. In step 502, the system determines whether a magnet exists for that content. If so, the magnet is updated in step 504. If no magnet exists, then step 506 will determine whether it is appropriate to create a magnet. If so, one or more magnets are created in step 508. For example if the information received in step 500 is a topic of interest that should be searched for than a magnet should be created. After updating an existing magnet, creating one or more new magnets or determining that it is not appropriate to create a new magnet, the system in step 410 will determine whether the information received in step 500 should be used to update the user profile for user A. For example, if the information received in step 500 includes demographic information about user A (age, name, gender, interests, etc.) then the user profile for user A should be updated in step 512. In step 514, the system determines whether any of the data received in step 500 is current context data for user A. If so, the context data for user A stored in context data store 178 is updated in step 516. In step 518, the system determines whether any of the data received in step 500 includes context data for other users (e.g. a user other than user A). If so, the context data for the other user is updated in step 520. In step 522, one or more events are created for any user that had his/her data updated in the process of FIG. 12. Thus, if user A is having a conversation with user B, and information provided to system 30 includes the location of user A and user B and words spoken between user A and user B, then the current context data for both user A and user B will be updated in steps 516 and 520 to indicate the location, function and key words for user A and user B.

Figure 13:
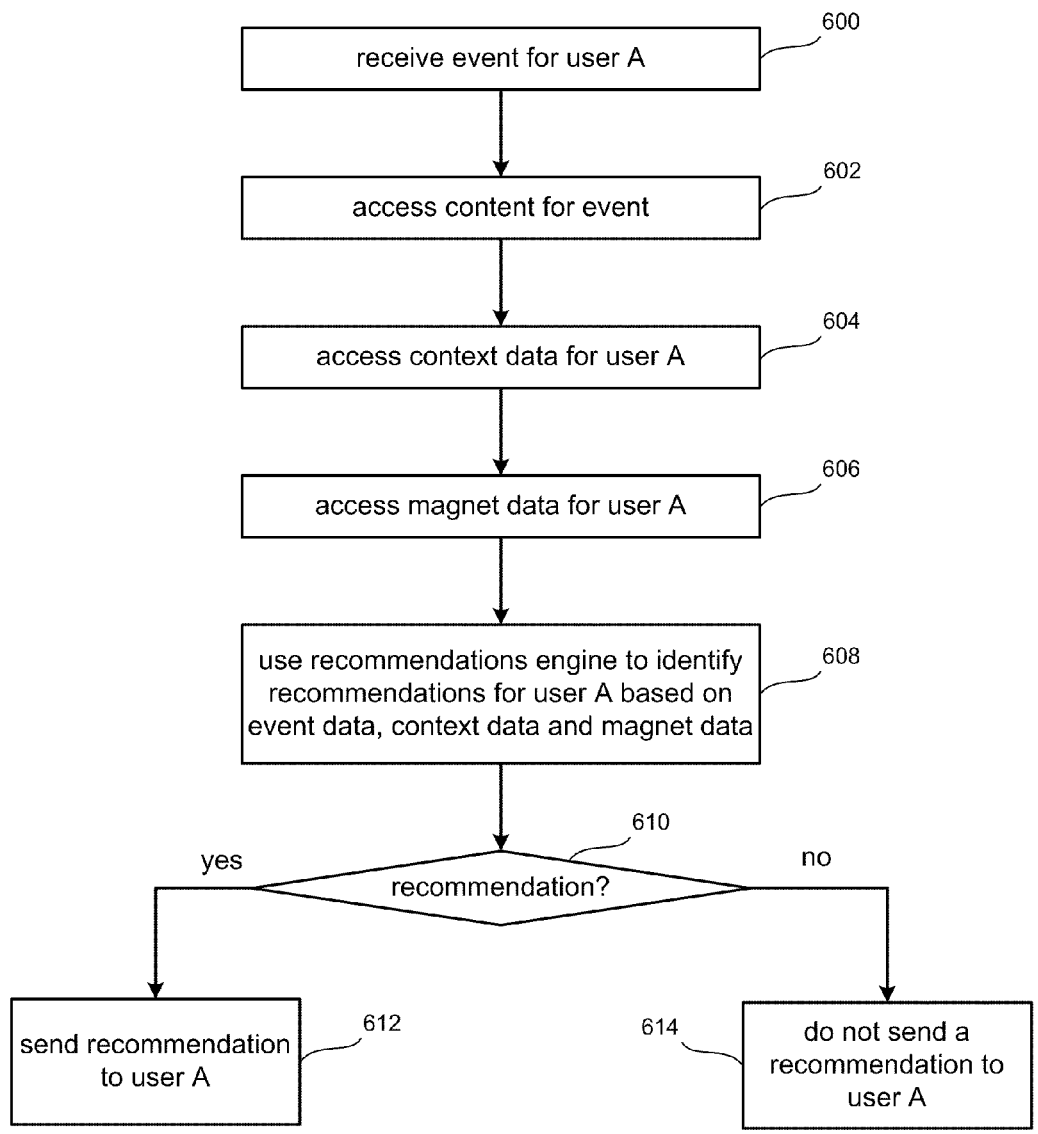
FIG. 13 is a flow chart describing one embodiment of a process for responding to events and identifying content for a user.

FIGS. 11 and 12 describe processes that include magnets generating database events when interesting content is found. FIG. 13 is a flowchart describing one embodiment of a process performed by the system in embodiment of FIG. 5 in response to the generation of an event. In one embodiment, the process of FIG. 13 can be performed by intelligent processing module 174 of FIG. 5 (which is part of controller 76 in FIG. 3). In step 600, an event will be received for a user (for example purposes, the user will be referred to as user A). In step 602, content for the event is accessed. As described above, when an event is generated, a database record is generated and stored in data store 172. That database record is accessed in step 602. In step 604, context data for user A is accessed from context data 178. In step 606, magnet data is accessed for user A. Any of the magnets that gathered data on behalf of user A will have that data stored in data store 172. All or a subset of the data is accessed in step 606. In step 608, the recommendations engine 78 will be used to identify recommendations for user A based on the event data, context data and magnet data accessed above. Additionally, context data for users who are friends and family or otherwise important to user A will also be included in the analysis. User A may have indicated who the friends and family are in one or more applications such as an email application, social networking application, instant messaging application, etc. If a recommendation is generated (step 610), then the recommendation is sent to user A by pushing the content to the client device in step 612. If no recommendation is identified (step 610), then no content is pushed to user A's client device (step 614). Examples of a recommendation can include informing the user of a sale at a store, a show at a theater, a concert, etc.

Figure 14:
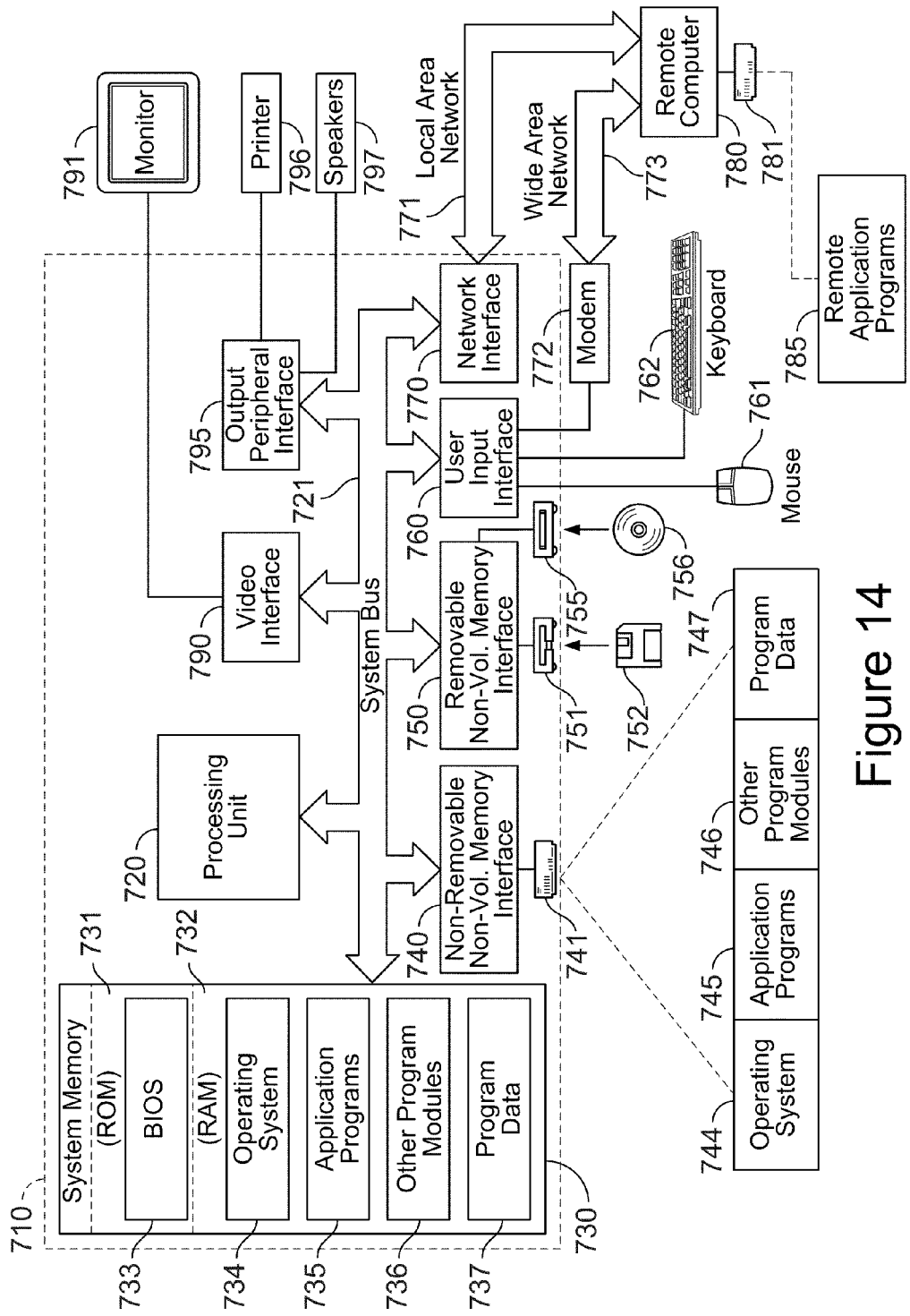
FIG. 14 is a block diagram describing the components of an example computing system that can be used to implement the components of FIG. 2 and perform the processes described herein.

FIG. 14 depicts an exemplary computing system 710 for implementing any of the devices of FIG. 2. Computing system 710 of FIG. 14 can be used to perform the functions described in FIGS. 3-5, as well as perform the various processes describe herein with respect to FIGS. 6-13. Components of computer 710 may include, but are not limited to, a processing unit 720 (one or more processors that can perform the processes described herein), a system memory 730 (that can stored code to program the one or more processors to perform the processes described herein), and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, and PCI Express.

Computing system 710 typically includes a variety of computer readable media. Computer readable media can be any available media that can be accessed by computing system 710 and includes both volatile and nonvolatile media, removable and non-removable media, including RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computing system 710.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 14 illustrates operating system 734, application programs 735, other program modules 736, and program data 737.

The computer 710 may also include other removable/non-removable, volatile/nonvolatile computer storage media. By way of example only, FIG. 14 illustrates a hard disk drive 740 that reads from or writes to non-removable, nonvolatile magnetic media, a magnetic disk drive 351 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through an non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 14, provide storage of computer readable instructions, data structures, program modules and other data for the computer 710. In FIG. 14, for example, hard disk drive 741 is illustrated as storing operating system 344, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. A user may enter commands and information into the computer through input devices such as a keyboard 762 and pointing device 761, commonly referred to as a mouse, trackball or touch pad. Other input devices (not shown) may include a microphone, joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through a output peripheral interface 790.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computing device 710, although only a memory storage device 781 has been illustrated in FIG. 14. The logical connections depicted in FIG. 14 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 14 illustrates remote application programs 785 as residing on memory device 781. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

We claim:
1. A method for delivering content, comprising:
  receiving, at a server system, indications of topics of interest from a first client, the indications of topics includes a photograph;
  automatically gathering content about the topics in response to receiving the indications, the gathering content includes automatically recognizing an object in the photographs, searching for information about that object using a network, and finding a retailer selling that object;
  receiving context information at the server system from the client, the contextual information includes a location of the client;
  identifying a subset of the gathered content based on the received context information; and
  reporting the identified subset of the gathered content, the reporting includes identifying that the retailer is selling the object in proximity to the client.
2. The method of claim 1, wherein:
  the indications of topics are associated with a first user; and
  the context information is associated with the first user.

3. The method of claim 2, wherein:
the reporting includes transmitting the identified subset of the gathered content to a second client that is a different type of device than the first client; and
the first client and the second client are associated with the first user.

4. The method of claim 2, wherein:
the gathering content includes determining information about one or more other users identified by the first user in one or more applications; and
the identifying a subset of the gathered content is performed in response to the context information and the information about one or more other users.

5. The method of claim 2, wherein:
the gathering content is performed without a request by the first user.

6. The method of claim 2, wherein:
the received context information includes an indication of a function being performed by the first user.

7. The method of claim 1, wherein:
the gathering content includes identifying events relevant to one or more of the topics.

8. A system that delivers content, comprising:
a first set of one or more computers comprising a radar service that is in communication with one or more clients, the first set of one or more computers receives indications of topics of interest from a first client associated with a first user; and
a second set of one or more computers comprising an intelligence service that is in communication with the first set of one or more computers comprising the radar service, the second set of one or more computer stores one or more indexes of information available for aggregation, the second set of one or more computers creates context information for the first user that includes intent of the first user derived from an inference based on an action of the first user other than the first user being in a specific location, the first set of one or more computers automatically and continuously gather content about the topics of interest by aggregating information related to the indications of topics of interest, the context information and the one or more indexes of information stored in the second set of one or more computers, the first set of one or more computers pushes the content to the first client for the first user.

9. The system of claim 8, wherein:
first set of one or more computers gather content about the topics of interest based on one or more key words automatically identified in speech detected from the first user by the first client.

10. The system of claim 8, wherein:
the first set of one or more computers include a relevancy engine that participates in filtering the gathered content by assigning a relevancy score to the gathered content based on how pertinent the gathered content is to the context information.

11. The system of claim 8, wherein:
the first set of one or more computers include magnets, which are persistent and personalized software processes that automatically and continuously collect information about a topic of interest;
the magnets automatically and continuously gather the content about the topics of interest.

12. The system of claim 11, wherein:
the first set of one or more computers include one or more recommendation engines, the magnets use the recommendation engines to identify content via a network; and
the first set of one or more computers include a relevancy engine that participates in filtering the gathered content by assigning a relevancy score to the gathered content based on how pertinent the gathered content is to the context information.

13. The system of claim 11, wherein:
the second set of one or more computers include a public index about content available via a network, one or more private indices about content available via the network, a data structure for ads and offers, and user profile data; and
the magnets automatically and continuously gather the content about the topics of interest based on the public index, the one or more private indices, the data structure for ads and offers, and user profile data.

14. The system of claim 8, wherein:
the context information includes an indication of an action being performed by the first user.

15. The system of claim 8, wherein:
the first set of one or more computers pushes the content to a second client associated with the first user.

16. One or more processor readable storage devices having processor readable code embodied on the one or more processor readable storage devices, the processor readable code for programming one or more processors to perform a method for delivering data, the processor readable code comprises:
interface software code that interfaces with a plurality of clients including a first client and a second client for receiving context information, the first client for interfacing with a first user and the second client for interfacing with a second user, the interface software code receives first context information from the first client about what the first user is currently doing so that context data for the first user can be updated based on the first context information from the first client, the interface software code receives second context information from the first client about what the second user is currently doing so that context data for the second user can be updated based on the second context information from the first client;
first magnet software code that receives a first topic of interest from the first user and continuously collects information about the first topic of interest via a network, the first magnet software code is persistent;
second magnet software code that receives a second topic of interest from the first user and continuously collects information about the second topic of interest via the network, the second magnet software code is persistent, wherein the first magnet software code interacts with the second magnet software code to identify an information of interest related to the first topic of interest and the second topic of interest;
filtering software code that filters the information of interest collected by the first magnet software code and the second magnet software code based on the updated context data for the first user, the interface software code transmits at least a subset of the filtered information to the first user, the filtering software code filters other information of interest from other magnets based on the updated context data for the second user.

17. The one or more processor readable storage devices of claim 16, wherein:
the first topic of interest received by the first magnet from the first user includes one or more key words automatically identified in speech automatically detected from the first user by the first client.

18. The one or more processor readable storage devices of claim 16, wherein:
   the second context information includes one or more key words automatically identified in speech detected from the second user by the first client.

\* \* \* \* \*